US008926861B2

(12) United States Patent
Eigen et al.

(10) Patent No.: US 8,926,861 B2
(45) Date of Patent: Jan. 6, 2015

(54) HYDROGEN-STORING COMPOSITE MATERIALS

(75) Inventors: Nico Eigen, Hamburg (DE); Martin Dornheim, Reppenstedt (DE); Rüdiger Bormann, Rosengarten (DE)

(73) Assignee: Helmholtz-Zentrum Geesthacht Zentrum für Material—und Küstenforschung GmbH, Geesthacht (DE)

( * ) Notice: Subject to any disclaimer, the term of this patent is extended or adjusted under 35 U.S.C. 154(b) by 1205 days.

(21) Appl. No.: 12/742,504

(22) PCT Filed: Oct. 30, 2008

(86) PCT No.: PCT/EP2008/064721
§ 371 (c)(1),
(2), (4) Date: Aug. 3, 2010

(87) PCT Pub. No.: WO2009/062850
PCT Pub. Date: May 22, 2009

(65) Prior Publication Data
US 2013/0187085 A1 Jul. 25, 2013

(30) Foreign Application Priority Data

Nov. 16, 2007 (DE) .......................... 10 2007 054 843

(51) Int. Cl.
| C01B 6/04 | (2006.01) |
| C01B 6/06 | (2006.01) |
| C01B 6/24 | (2006.01) |
| C01F 7/54 | (2006.01) |
| C01B 3/00 | (2006.01) |
| B02C 23/18 | (2006.01) |

(52) U.S. Cl.
CPC ............... *C01B 3/0078* (2013.01); *B02C 23/18* (2013.01); *Y02E 60/327* (2013.01)
USPC ............ 252/188.25; 252/188.26; 252/188.27; 423/465; 423/472; 423/490; 423/497; 423/499.1; 423/644; 423/646; 423/647

(58) Field of Classification Search
USPC ........... 252/188.25, 188.26, 188.27; 423/465, 423/472, 490, 497, 499.1, 644, 646, 647
See application file for complete search history.

(56) References Cited

U.S. PATENT DOCUMENTS

| 5,964,965 A | 10/1999 | Schulz et al. |
| 7,201,789 B1 | 4/2007 | Schulz et al. |
| 2006/0194695 A1 | 8/2006 | Au |
| 2007/0025908 A1 | 2/2007 | Sandrock et al. |

FOREIGN PATENT DOCUMENTS

| DE | 102004061286 A1 | 6/2006 |
| DE | 102007054843 A1 | 5/2009 |
| WO | WO-2006063627 A1 | 6/2006 |
| WO | WO-2006079312 A1 | 8/2006 |
| WO | WO-2007091894 A1 | 8/2007 |

OTHER PUBLICATIONS

Bérubé et al., "Size Effects on the Hydrogen Storage Properties of Nanostructured Metal hydrides: A Review," International Journal of Enery Reseach, vol. 31, Mar. 14, 2007, pp. 637-663.
International Search Report for PCT/EP2008/064721, (Apr. 2009).
Messer, "Hydrides Versus Fluorides: Structural Comparisons," Journal of Solid State Chemistry, vol. 2, 1970, pp. 144-155.
Rönnebro et al., "Investigation of the Perovskite Related Structures of $NaMgH_3$, $NaMgF_3$, and $Na_3AlH_6$," Journal of Alloys and Compounds, vol. 299, 2000, p. 101-106.
Bogdanovic et al., "Metal-doped Sodium Aluminum Hydrides as Potential New Hydrogen Storage Materials," Journal of Alloys and Compounds 302 (2000) 56-58.

*Primary Examiner* — Peter F Godenschwager
(74) *Attorney, Agent, or Firm* — Marshall, Gerstein & Borun LLP

(57) ABSTRACT

The present invention relates to a hydrogen-storing composite material which is convertible essentially reversibly between a storing state and a non-storing state, wherein the reaction enthalpy in this conversion reaction can be set in a targeted manner to a value between 15 and 80 kJ/mol of $H_2$, preferably 25 to 40 kJ/mol of $H_2$. Hydrogen-storing composite materials are characterized in that, in the storing state, they comprise at least one complex metal halide of alkali metal or alkaline earth metal and an element of main group three of the Periodic Table of the Elements and also at least one complex metal hydride of alkali metal or alkaline earth metal and an element of main group three of the Periodic Table of the Elements, or in the storing state at least one metal halohydride of alkali metal or alkaline earth metal and an element of main group three of the Periodic Table of the Elements, and in the non-storing state, at least one alkali metal halide or alkaline earth metal halide and a metal of main group three of the Periodic Table of the Elements.

12 Claims, 8 Drawing Sheets

HYDROGEN-STORING COMPOSITE MATERIALS

The present invention relates to hydrogen-storing composite materials which can be converted essentially reversibly between a storage state and a nonstorage state, and also a process for producing these.

Energy storage by means of hydrogen has been gaining increasing importance in recent times. There are now various techniques for storing hydrogen among which a distinction can be made between storage in the gaseous state, the liquid state or in the chemically bound state in the form of metal hydrides. The storage of gaseous or liquid hydrogen often leads to safety problems. Hydrogen storage systems in which hydrogen is stored in the chemically bound state in the form of metal hydrides are therefore advantageous. Such metal hydride hydrogen stores have a storage state and a nonstorage state, between which they can be converted essentially reversibly.

Metal hydride hydrogen stores which are of particular interest are the alkali metal alanates $NaAlH_4$, $LiAlH_4$, $Li_3AlH_6$, $LiNa_2AlH_6$, $CaAlH_5$ and borohydrides such as $LiBH_4$, $NaBH_4$, $Mg(BH_4)_2$, $Ca(BH_4)_2$ because their relatively high hydrogen storage capacity per unit mass. In the case of $NaAlH_4$, hydrogen is liberated, for example, in the following reaction steps:

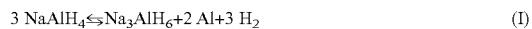

$$3\ NaAlH_4 \leftrightharpoons Na_3AlH_6 + 2\ Al + 3\ H_2 \tag{I}$$

$$2\ Na_3AlH_6 \leftrightharpoons 6\ NaH + 2\ Al + 3\ H_2 \tag{II}$$

For reaction step (I), the equilibrium temperature at 1 bar of hydrogen is 33° C., which corresponds to the measured enthalpy of reaction of about 37 kJ/mol of $H_2$, and for reaction step (II) it is 110° C., which corresponds to the measured enthalpy of reaction of about 47 kJ/mol of $H_2$.

The enthalpy of reaction is changed when sodium is replaced by another alkali metal or an alkaline earth metal and/or aluminum is replaced by another element of the third main group of the Periodic Table of the Elements.

No combination of alanates and borohydrides for which the thermodynamic equilibrium in all reaction steps is at about room temperature (23° C.) and from about 1 to 10 bar of $H_2$, corresponding to an enthalpy of reaction of about 30 kJ/mol, has been known hitherto. However, such hydrogen-storing materials having an enthalpy of reaction of about 30 kJ/mol would be desirable for many applications.

It is therefore an object of the invention to provide hydrogen-storing materials based on aluminum hydrides and/or borohydrides which can be converted essentially reversibly between a storage state and a nonstorage state, with the enthalpy of reaction this conversion reaction being able to be set in a targeted manner to a value in the range from 15 to 80 kJ/mol of $H_2$, preferably from 25 to 40 kJ/mol of $H_2$, for example about 30 kJ/mol of $H_2$.

Another object of the present invention is to provide a process for producing such hydrogen-storing materials.

The object is achieved by a hydrogen-storing composite material which can be converted essentially reversibly between a storage state and a nonstorage state and in the storage state contains at least one complex metal hydride of an alkali metal or alkaline earth metal and an element of the third main group of the Periodic Table of the Elements and also at least one complex metal halide of an alkali metal or alkaline earth metal and an element of the third main group of the Periodic Table of the Elements or in the storage state contains at least one complex metal halide hydride of an alkali metal or alkaline earth metal and an element of the third main group of the Periodic Table of the Elements and in the nonstorage state contains at least one alkali metal halide or alkaline earth metal halide and one metal of the third main group of the Periodic Table of the Elements.

The halide is preferably selected from the group consisting of fluoride, chloride, bromide and mixtures thereof. The element of the third main group of the Periodic Table is preferably selected from the group consisting of boron, aluminum and mixtures thereof. The alkali metal is preferably selected from the group consisting of lithium, sodium, potassium and mixtures thereof. The alkaline earth metal is preferably selected from the group consisting of beryllium, magnesium, calcium and mixtures thereof.

Particular preference is given to hydrogen-storing composite materials which in the loaded state contain at least one complex metal hydride of lithium, sodium, magnesium and/or calcium and also aluminum or boron and at least one complex metal halide of lithium, sodium, magnesium and/or calcium and also aluminum or boron, for example composite materials containing $Na_3AlH_6$ and $Na_3AlF_6$, $Li_3AlH_6$ and $Li_3AlF_6$, $NaAlH_4$ and $NaAlCl_4$, $NaBH_4$ and $NaBF_4$, $LiBH_4$ and $LiBF_4$, $Ca(BH_4)_2$ and $Ca(CF_4)_2$, $Ca(AlH_4)_2$ and $Ca(AlF_4)_2$ and/or $Mg(BH_4)_2$ and $Mg(BF_4)_2$. The thermodynamic reaction equilibrium of the conversion between a storage state and a nonstorage state is preferably at a temperature of from about −40° C. to 300° C., more preferably from about −40° C. to 80° C., in particular from about 15° C. to 40° C., even more preferably from about 20° C. to 35° C. and most preferably from about 20° C. to 30° C., and a pressure of from about 0.1 to 20 bar absolute, more preferably from 1 to 10 bar absolute, even more preferably from 5 to 8 bar absolute.

Particular complex metal hydrides and/or complex metal halides of an alkali metal or alkaline earth metal and an element of the third main group of the Periodic Table of the Elements have a perovskite structure.

Apart from the complex metal hydrides and complex metal halides described, the composite materials of the invention can contain further constituents such as alkali metal halides or alkaline earth metal halides and/or metals of the third main group of the Periodic Table of the Elements and/or further complex hydrides.

The enthalpy of reaction of the conversion between a storage state and a nonstorage state is preferably from 25 to 40 kJ/mol of $H_2$, preferably from 25 to 35 kJ/mol and in particular about 30 kJ/mol of $H_2$.

The hydrogen-storing composite materials of the invention are preferably produced by a process in which an alkali metal halide compound and/or an alkaline earth metal halide compound is mixed with a metal powder of an element of the third main group of the Periodic Table of the Elements and subjected to mechanical stress, for example milling. Preference is given to using ball mills, e.g. vibratory mills, attritors, etc., for this purpose. The milled mixture can subsequently be hydrogenated. The molar ratio of alkali metal halide or alkaline earth metal halide to metal powder of an element of the third main group of the Periodic Table of the Elements is preferably from 0.01:1 to 100:1, more preferably 0.1:1 to 10:1 and in particular from 0.5:1 to 3:1 and in particular about 1:1. Milling preferably takes place in a dry atmosphere which is low in oxygen, preferably under a nitrogen atmosphere, an argon atmosphere, a hydrogen atmosphere or under reduced pressure, more preferably at a pressure of from 0.00001 mbar absolute to 10 bar absolute, preferably at a pressure of from ambient pressure to 20 mbar above ambient pressure.

Milling preferably takes place at temperatures in the range from 77K to 115° C., more preferably from 15° C. to 35° C., even more preferably from 20° C. to 25° C. The hydrogenation is preferably carried out after introduction of the alloy into a pressure vessel under conditions for which the pressure vessel is designed, preferably at a temperature in the range from −40° C. to 300° C., more preferably from 15° C. to 150° C., and a hydrogen pressure of from 1 to 800 bar, preferably from 5 to 100 bar, more preferably from 10 to 50 bar.

The following examples illustrate the invention but do not restrict it.

EXAMPLE 1

NaF powder and Al powder were mixed in a molar ratio of 1:1 and milled under inert gas (argon) for five hours in a planetary ball mill. The milled material was subsequently hydrogenated at 145 bar and 140° C. for eight hours. The hydrogenated material was dehydrogenated at 350° C.

Figure 1:
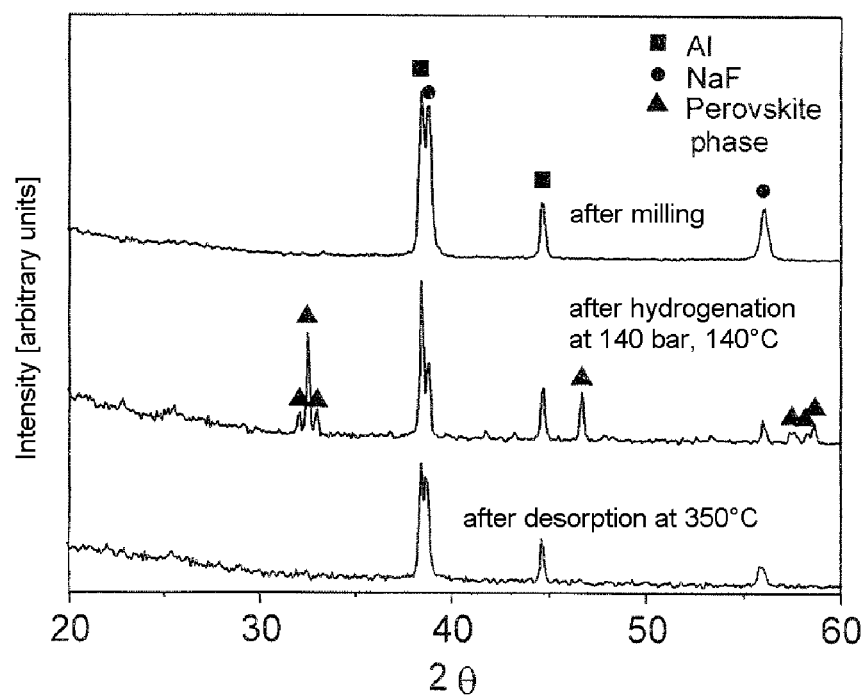
FIG. 1 is an X-ray diffraction pattern of a reaction product of NaF powder and Al powder (example 1) milled under argon gas for 5 hours after hydrogenation at 140° C. and 145 bar and after renewed hydrogenation at 350° C.

FIG. 1 shows an X-ray diffraction pattern of the reaction product after milling for five hours (upper spectrum), after hydrogenation at 140° C. and 145 bar (middle spectrum) and after renewed dehydrogenation at 350° C. (lower spectrum). According to FIG. 1, NaF and Al are the only phases present before hydrogenation. After hydrogenation of the material, the spectrum additionally shows a perovskite phase resembling $Na_3AlH_6$ and $Na_3AlF_6$. After renewed dehydrogenation, again it is only NaF and Al phases that can be detected. The material can accordingly be converted essentially reversibly between a storage state and a nonstorage state.

Figure 2:
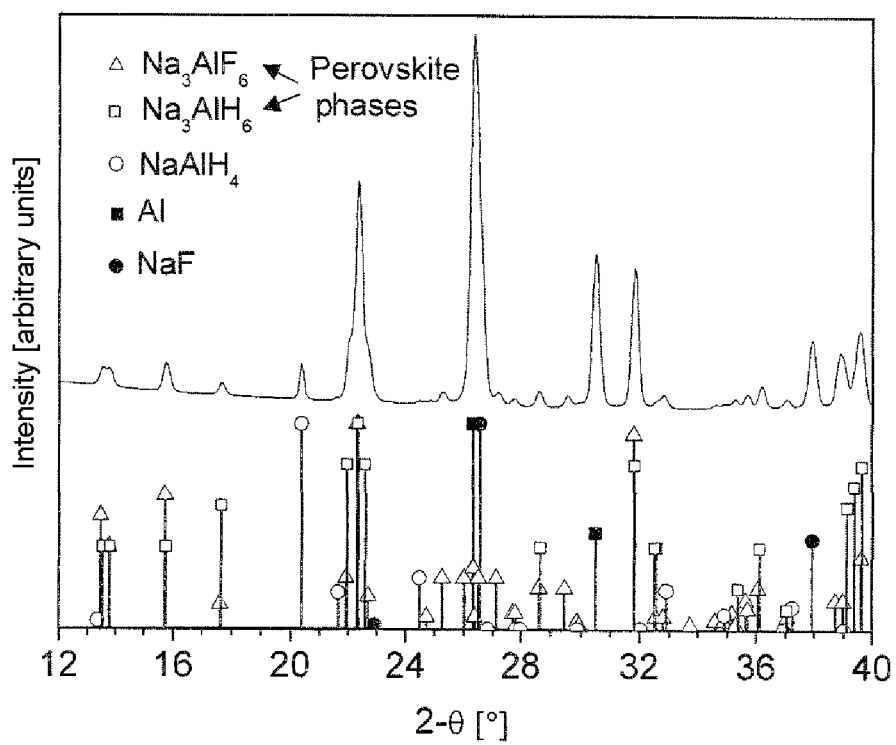
FIG. 2 shows a spectrum of the sample of example 1 recorded by means of synchrotron diffractometry after hydrogenation (upper spectrum) and the associated calculated bands (lower spectrum).

FIG. 2 shows a spectrum of the sample recorded by means of synchrotron diffractometry after hydrogenation (upper spectrum) and the associated calculated bands (lower spectrum). This shows the presence of NaF, Al, $Na_3AlH_6$, $Na_3AlF_6$ and $NaAlH_4$ phases.

Figure 3:
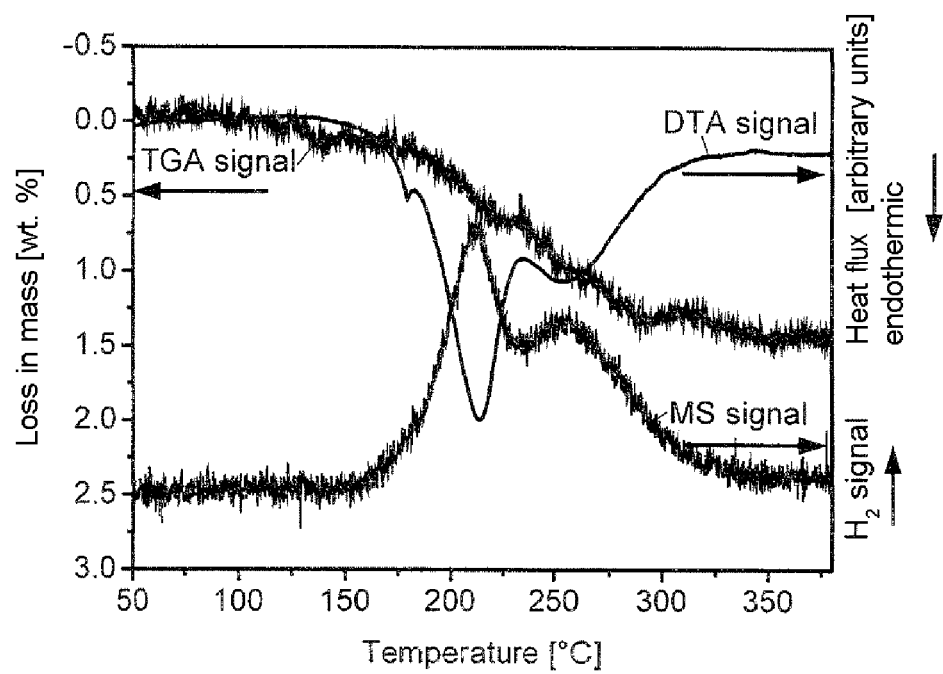
FIG. 3 shows the results of simultaneous TGA, DTA and MS measurements in the hydrogen region on the hydrogenated material of example 1.
Figure 4:
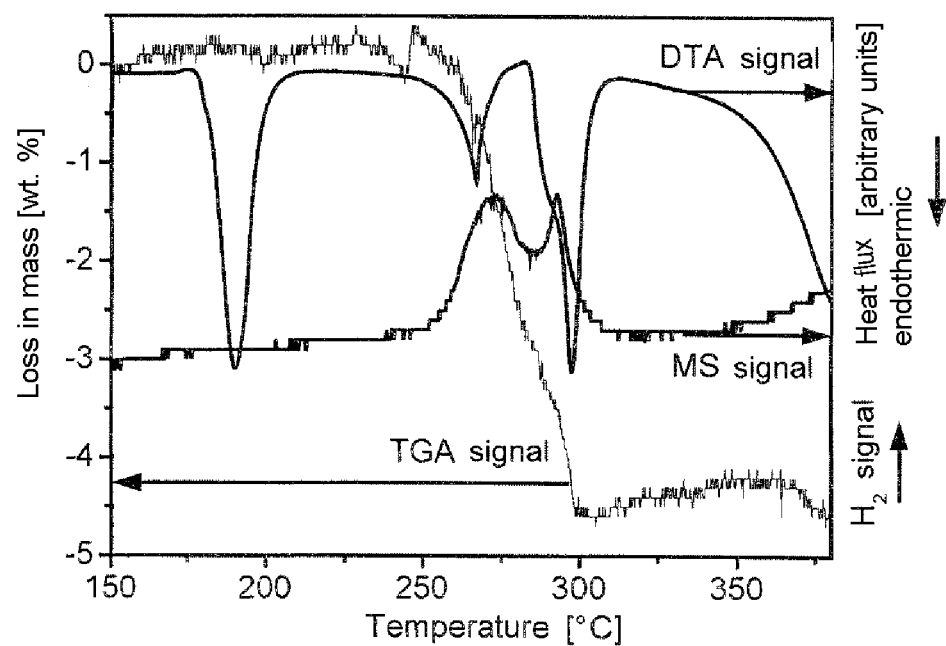
FIG. 4 shows the result of simultaneous TGA, DTA and MS measurements in the hydrogen region on pure $NaAlH_4$.

FIG. 3 shows the results of simultaneous TGA, DTA and MS measurements in the hydrogen region on hydrogenated material as per example 1, and FIG. 4 shows the result of simultaneous TGA, DTA and MS measurements in the hydrogen region on pure $NaAlH_4$. The TGA signal in FIG. 3 shows that a loss in mass takes place in the temperature range 170-300° C. The MS signal shows that the loss in mass is due to hydrogen. Detection in the region of $F_2$ and HF gave no indication of any liberation of fluorine atoms. FIG. 3 also shows that the enthalpy of reaction for the decomposition of the two phases $NaAlH_4$ and $Na_3AlH_6$ is about equal.

EXAMPLE 2

Figure 5:
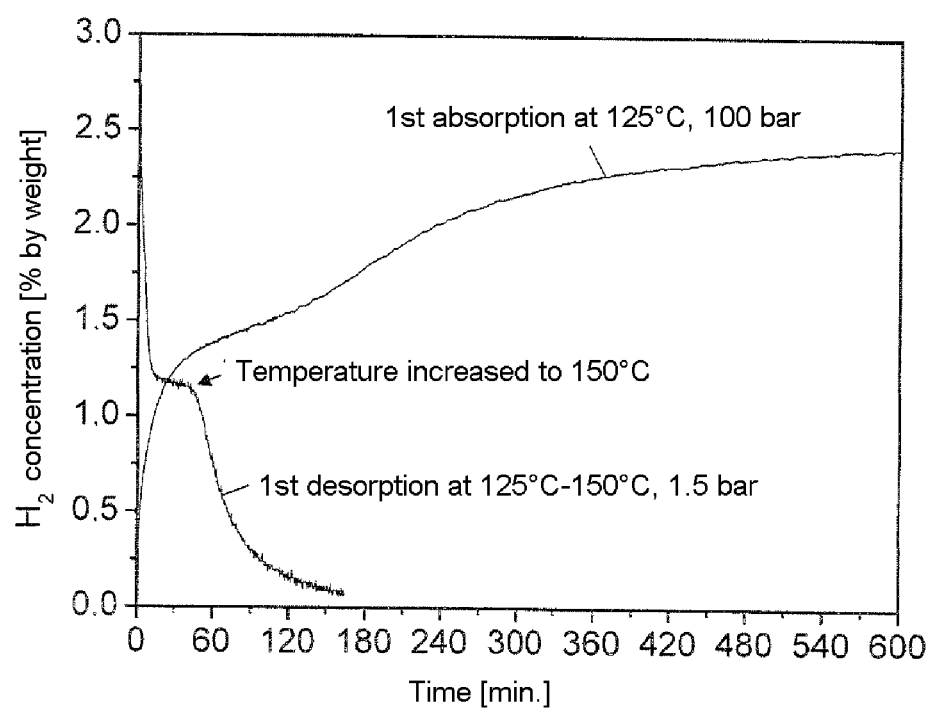
FIG. 5 shows the absorption and desorption of hydrogen by/from NaH+NaF+2 Al of example 2 using the catalyst $TiCl_4$ measured by means of a Sievert apparatus.

NaF, NaH powder and Al powder were mixed in a ratio of 1:1:2 with 2 mol % of $TiCl_4$ as catalyst and milled under inert gas for 5 h in a planetary ball mill. The material was subsequently hydrogenated at 100 bar and 125° C. FIG. 5 shows the absorption and desorption of hydrogen by/from NaH+NaF+2 Al using the catalyst $TiCl_4$ measured by means of a Sievert apparatus. FIG. 5 shows that reversible hydrogen absorption is possible.

Figure 6:
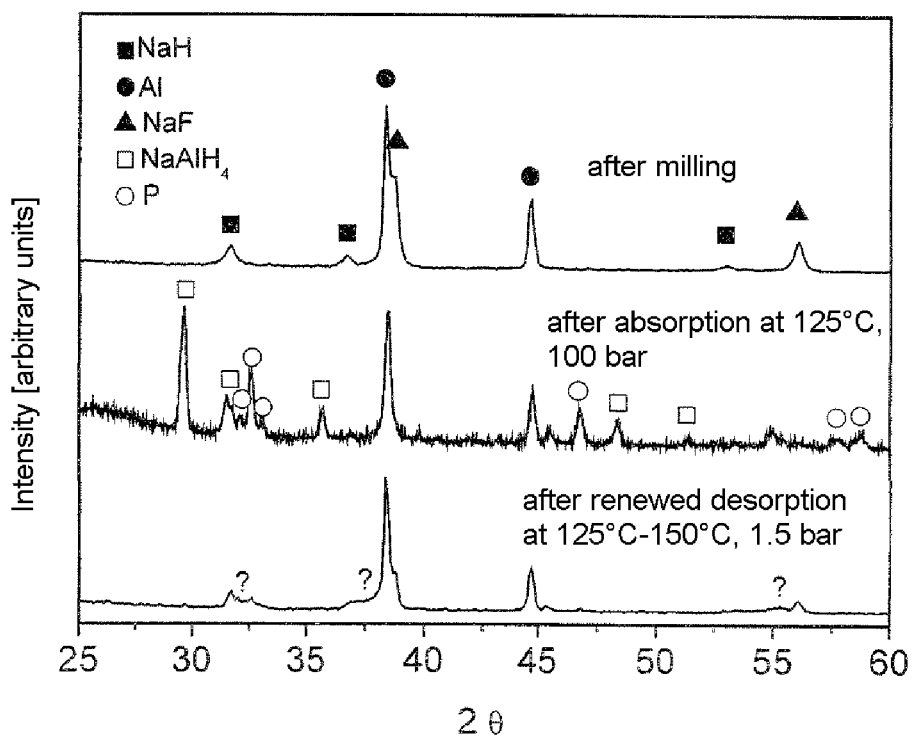
FIG. 6 shows the X-ray diffraction measurement on the material of example 2 after mixing and milling and also after hydrogen absorption and renewed hydrogen desorption.

FIG. 6 shows the X-ray diffraction measurement on the material after mixing and milling and also after hydrogen absorption and renewed hydrogen desorption. After milling, the starting materials NaF, NaH and Al are present. Owing to its small proportion, the catalyst cannot be detected. After absorption, $NaAlH_4$ and a phase P resembling $Na_3AlH_6$ and $Na_3AlF_6$ have been formed, and NaH and NaF can no longer be detected. After subsequent hydrogen desorption, the complex hydrides $NaAlH_4$ and P are again no longer present. However, a further phase is also present in addition to NaF and NaH. As regards this, it could be demonstrated that a mixed phase which in equilibrium corresponds approximately to the stoichiometry $Na_2FH$ is formed from NaH and NaF on heating.

EXAMPLE 3

Figure 7:
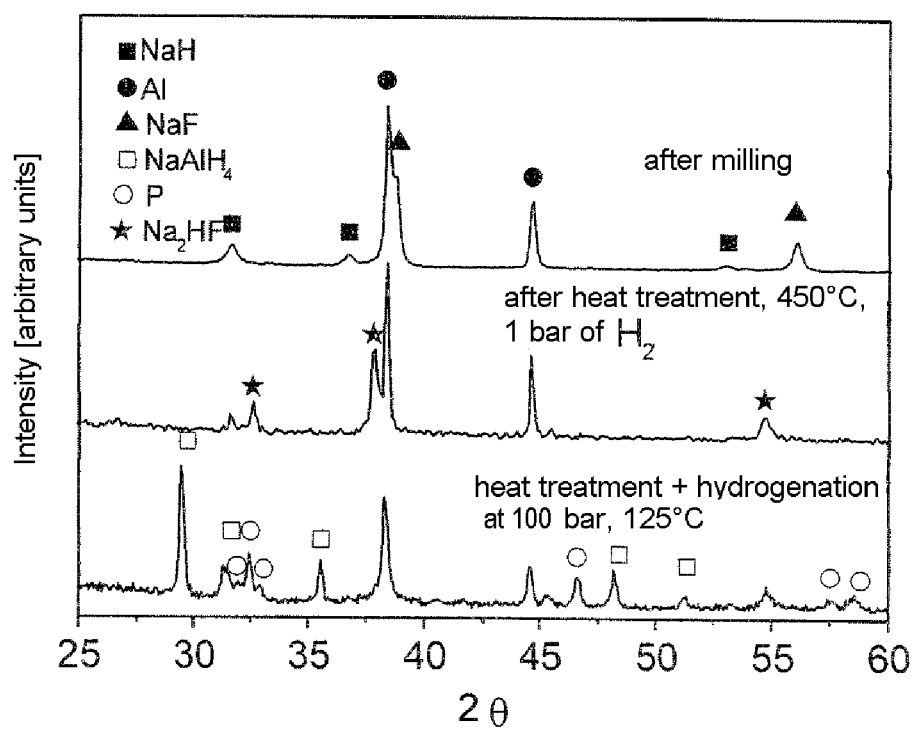
FIG. 7 shows the X-ray diffraction pattern of the material of example 2 after heating to 450° C. for about 1 hour under a hydrogen atmosphere (1 bar absolute) and hydrogenated again under 1 bar (see example 3).

To demonstrate that reversible hydrogen storage is also possible when such mixed phases are formed, the material was heated to 450° C. for about 1 h under a hydrogen atmosphere (1 bar absolute) and hydrogenated again under 1 bar. Heating of the material forms a mixed phase whose lattice constant is between phase-centered cubic NaH and phase-centered cubic NaF ($Na_2FH$) (FIG. 7). After subsequent successful hydrogen absorption, the complex hydrides/halides $NaAlH_4$ and P are again clearly detectable and the material thus corresponds to the loaded state without heat treatment. The conversion is therefore essentially reversible.

EXAMPLE 4

Figure 8:
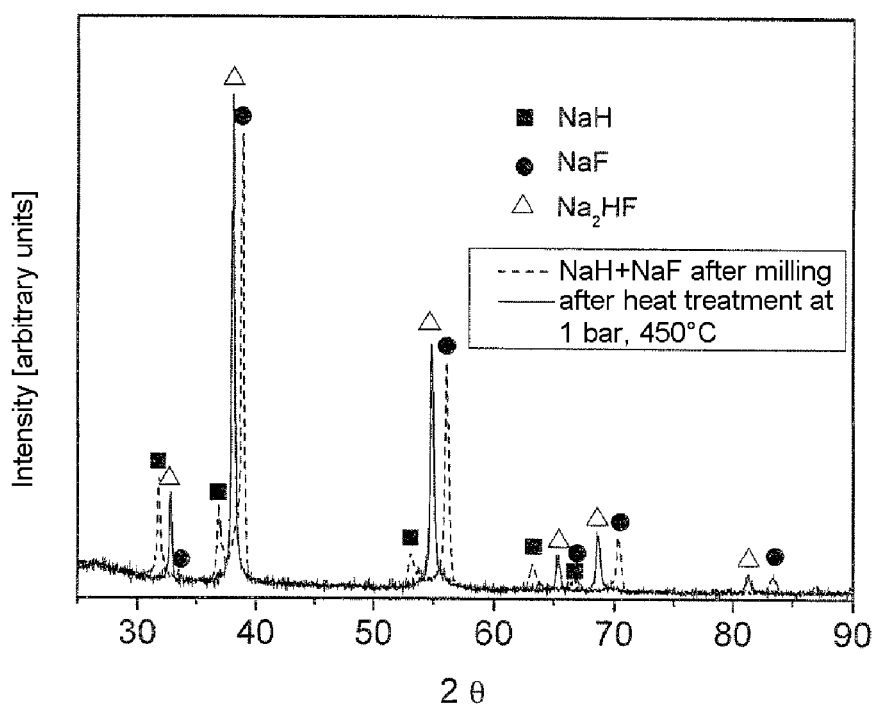
FIG. 8 shows the synchrotron diffraction pattern of the material of example 4 comparing the material before and after heat treatment.

To confirm the reactions between NaF and NaH, NaH and NaF were mixed in a molar ratio of 1:1 and milled under argon for 5 h in a planetary ball mill and subsequently heated up continuously under 1 bar of hydrogen. The synchrotron diffraction measurement carried out shows that the lattice constants of the two phases continuously approach one another, indicating a mixing reaction. A volumetric measurement indicated no significant liberation of gases during the heat treatment, i.e. the original composition was maintained. Comparison of the lattice structures before and after heat treatment (FIG. 8) shows that a new phase $Na_2FH$ has been formed from the two phases NaF and NaH originally present.

The invention claimed is:

1. A hydrogen-storing composite material which can be converted essentially reversibly between a storage state and a nonstorage state, characterized in that the storage state contains:

(a) at least one complex metal hydride of an alkali metal or an alkaline earth metal and an element of the third main group of the Periodic Table of the Elements and (b) at least one complex metal halide of an alkali metal or an alkaline earth metal and an element of the third main group of the Periodic Table of the Elements and the nonstorage state contains (c) at least one alkali metal halide, or alkaline earth metal halide; an alkali metal hydride or alkaline earth metal hydride; and one metal of the third main group of the Periodic Table of the Elements.

2. The hydrogen-storing composite material as claimed in claim 1, characterized in that the halide is selected from the group consisting of fluoride, chloride, bromide and mixtures thereof.

3. The hydrogen-storing composite material as claimed in either of the preceding claims, characterized in that the element of the third main group of the Periodic Table is selected from the group consisting of boron, aluminum and mixtures thereof.

4. The hydrogen-storing composite material as claimed in claim 1, characterized in that the alkali metal is selected from the group consisting of lithium, sodium, potassium and mixtures thereof.

5. The hydrogen-storing composite material as claimed in claim 1 or claim 4, characterized in that the alkaline earth metal is selected from the group consisting of beryllium, magnesium, calcium and mixtures thereof.

6. The hydrogen-storing composite material as claimed in claim 1, 2 or 4, characterized in that the at least one complex metal hydride of an alkali metal or an alkaline earth metal and an element of the third main group of the Periodic Table of the Elements has a perovskite structure.

7. The hydrogen-storing composite material as claimed in claim 1, 2 or 4, characterized in that the at least one complex metal halide of an alkali metal or an alkaline earth metal or an element of the third main group of the Periodic Table of the Elements has a perovskite structure.

8. The hydrogen-storing composite material as claimed in claim 7, characterized in that the storage state contains $Na_3AlH_6$ and $Na_3AlF_6$ and the nonstorage state contains NaF and Al.

9. The hydrogen-storing composite material as claimed in claim 7, characterized in that the storage state contains $Li_3AlH_6$ and $Li_3AlF_6$ and the nonstorage state contains LiF and Al.

10. The hydrogen-storing composite material as claimed in claim 1, 2 or 4, characterized in that the storage state contains:
    (a) at least one complex metal hydride of lithium and/or sodium and aluminum and
    (b) at least one complex metal halide of lithium and/or sodium and aluminum.

11. The hydrogen-storing composite material as claimed in claim 1, 2 or 4, characterized in that the thermodynamic reaction equilibrium of the conversion between a storage state and a nonstorage state is at a temperature of from about −40° C. to 80° C. and a pressure of from about 1 to 10 bar absolute.

12. The hydrogen-storing composite material as claimed in claim 1, 2 or 4, characterized in that the enthalpy of reaction of the conversion between a storage state and a nonstorage state is from 15 to 80 kJ/mol of $H_2$.

* * * * *